United States Patent [19]

Thurner

[11] 4,102,238
[45] Jul. 25, 1978

[54] ANCHORING ASSEMBLY FASTENABLE BY AN EXPLOSIVE POWDER DRIVEN SETTING TOOL

[75] Inventor: Elmar Thurner, Altenstadt, Austria

[73] Assignee: Hilti Aktiengesellschaft, Schaan, Liechtenstein

[21] Appl. No.: 789,524

[22] Filed: Apr. 21, 1977

[30] Foreign Application Priority Data

Apr. 22, 1976 [DE] Fed. Rep. of Germany ....... 2617509

[51] Int. Cl.² .................. B23P 19/00; F16B 15/00
[52] U.S. Cl. .................... 85/10 E; 29/526 R; 403/405
[58] Field of Search ............... 85/10 E, 10 R; 151/41.73; 248/216.1, 216.2; 29/526, 505; 403/405, 244–246

[56] References Cited

U.S. PATENT DOCUMENTS

| | | | |
|---|---|---|---|
| 2,968,984 | 1/1961 | DeCaro | 85/10 E |
| 3,137,195 | 6/1964 | Rosenberg | 85/10 E |
| 3,455,199 | 7/1969 | Semanchik | 85/10 E |
| 3,841,474 | 10/1974 | Maier | 85/10 E X |

FOREIGN PATENT DOCUMENTS

| | | | |
|---|---|---|---|
| 565,770 | 4/1958 | Belgium | 85/10 E |
| 567,464 | 5/1958 | Belgium | 85/10 E |
| 1,535,110 | 6/1968 | France | 85/10 E |
| 1,099,807 | 2/1961 | Fed. Rep. of Germany | 85/10 E |

*Primary Examiner*—Ramon S. Britts
*Attorney, Agent, or Firm*—Toren, McGeady and Stanger

[57] ABSTRACT

An anchoring assembly, in particular for use in a composite concrete and structural steel beam, consists of a cylindrical container shaped member open at one end and closed at the other with an opening extending through the closed end. A fastening stud is positioned in the bore in the member adjacent the open end and it is arranged to be driven through the bore into a receiving material, for instance, a structural steel member, by an explosive powder actuated setting gun. The fastening stud has an elongated shank with a larger diameter head at one end and a washer fitted on the shank and spaced axially from the head. The radially outer surfaces of the head and washer act as guide surfaces as the stud is driven through the bore into the receiving material. The opening through the closed end has an axially extending frusto-conically shaped section diverging toward and terminating in the outer surface of the closed end.

11 Claims, 3 Drawing Figures

ANCHORING ASSEMBLY FASTENABLE BY AN EXPLOSIVE POWDER DRIVEN SETTING TOOL

SUMMARY OF THE INVENTION

The present invention is directed to an anchoring assembly, particularly for use in composite concrete and structural steel beams and the like, and consists of a cup-shaped member and a fastening stud positioned within a bore through the member so that it can be driven into a receiving material by an explosive powder actuated setting tool. One end of the bore in the member is closed, however, it has an opening through which the stud shank can be driven for insertion into the receiving material.

Composite concrete and structural steel beams and the like are members whose upper chord consists of a reinforced concrete slab with the lower chord formed of a structural steel section, a lattice type beam or a similar steel member. To provide utilization of the full moment of inertia of the beam, a shear-resistant connection between the concrete upper chord and the structural steel lower chord is necessary.

To produce such a connection it has been known to fasten anchoring members to the lower chord, that is, to a structural steel section or lattice girder, to afford an anchor for the concrete slab poured over the structural steel section or built-up member. Under load, variations occur between the upper and lower chords of these composite structural members, accordingly, the anchoring members must be capable of absorbing shearing loads to safeguard the bond between the different parts of the composite member.

In the past it has been known to secure rolled sections or round studs on the structural steel member by welding. While such elements adequately absorb the shearing load, there are problems involved in the manner in which the elements are attached to the structural steel. The problem is due, in particular, to the fact that the structural steel member is usually covered with an anti-corrosion layer which has an adverse effect on a weld union. Even if the surfaces to be welded are clean there is the disadvantage of the expenditure in time involved in the cleaning and, further, the quality of the welds cannot be substantially improved, because the humid environment, that is, the weather conditions, within which the welds must be made, have a negative effect.

To overcome this problem, anchoring studs have been driven into the structural steel members by means of an explosive powder-actuated setting tool. While the energy-independent possibility of such attachment of anchoring members is advantageous, it has not proved satisfactory because the studs used do not withstand the shearing and bending loads and, as a result, break, causing a failure of the union or bond between the upper and lower chords of the composite member. To circumvent this disadvantage, specially designed elements have been used, which are fastened to the structural steel member by means of studs driven by explosive powder actuated setting tools, these elements serve to absorb the bending loads which occur. The elements used in the past for this purpose have been relatively complicated in their structure and, therefore, have been unable to contribute to the economic production of such composite concrete and structural steel supports.

In the search for economical anchoring elements which can be fastened using an explosive powder actuated setting tool for driving a stud and which can withstand the bending loads developed, the use of cup-shaped members has evolved, such as the members which are fastened on ceilings or walls for securing wires or the like. Such cup-shaped members, as disclosed in Pat. No. 3,455,199, could not be used for this new purpose directly, because they had to undergo considerable changes with regard to dimensions, for example, the axial length of the member, its wall thickness and the like. These cup-shaped or cylindrical container-shaped members, since they have a much larger mass as compared to the known cup-shaped members, they can no longer be used in a conventional manner where the fastening stud was inserted into the bottom of the bore in the member with both parts forming an element feedable into a setting tool. If an impact piston tool is used to install the assembly, it would have the effect that the impact of the energy of the piston striking the stud would be such that sufficient driving of the stud would not be assured. Further, the sudden acceleration of the cup-shaped member having a considerable mass might tend to tear out its bottom. If a contact piston principal tool is used instead of an impact piston tool, due to the large mass to be accelerated consisting of the cup-shaped member and stud of the assembly, the reaction or rebound of the setting tool becomes unacceptably high.

Therefore, it is the primary object of the present invention to provide an economical anchoring assembly which can be secured by driving the fastening stud using an explosive powder actuated setting tool, and which fulfills the load requirements, in particular when used for composite concrete and structural steel beams.

In accordance with the present invention, the problem experienced in the past is solved by utilizing an anchoring assembly made up of a cylindrical container-shaped member and a fastening stud with the stud positioned in the bore in the member spaced axially from its bottom or closed end.

With such a positioning of the stud in the bore in the member, it is possible to employ the advantageous properties of a coacting piston principal tool without having to feed the member and the stud singly to the tool. As previously known, the setting tools used for such attachments merely need to have a recess in the barrel which corresponds to the outside dimensions of the cylindrical container-shaped member. In accordance with the present invention, the axial length of the recess can be approximately equal to or slightly shorter than the axial length of the cylindrical container-shaped member.

When the setting tool is placed against the receiving material, that is, against the structural steel section or built up beam member, the cylindrical container-shaped member is already in contact. During the driving operation, therefore, the member undergoes no acceleration, rather the fastening stud is driven by the piston of the setting tool through the bore in the member into the receiving material with the bore in the member serving to guide the stud. Accordingly, the full kinetic energy of the piston in the setting tool is available for driving the stud into the receiving material. With the bottom of the member already in contact with the receiving material, the inpingement of the head of the stud against the closed bottom of the bore cannot lead to the bottom being torn out or damaged.

To counteract any energy losses caused by a shock effect between the piston and the stud, the stud is preferably arranged in the end of the bore through the member opposite its closed end or bottom. To assure adequate guidance of the stud through the bore before it strikes the receiving material, it is desirable to provide two axially spaced guiding surfaces for the stud. While one of the guiding surfaces can be formed by the circumferential periphery of the head of the stud, in accordance with the present invention, the other guide surface can be provided by the radially outer surface of a washer mounted on the shank in spaced relation with the head. These guiding surfaces also ensure the retention of the stud within the bore in the member. Such retention can be achieved by projections within the bore of the member or by a slight overdimension of the stud head or of the washer. While the washer may be a conventional steel washer, it is preferable to use a plastic washer. The use of a plastic washer has the advantage that it may be provided with resilient projections on its outer circumferential surface for assuring adequate retention of the stud in position in the bore of the cylindrical container-shaped member. Moreover, when a plastic washer is used it is displaced when the stud head impinges against it, so that the stud can penetrate into the receiving material over the full length of its shank without any interference from the washer.

Another feature of the invention is the provision of the stud with a head having a diameter considerably greater than the diameter of the shank and with a curved transitional area extending from the shank to the head with the curved surface having an increasingly greater radius from the shank to the head. Such a fastening stud ensures a secure connection even when the driving energy relative to the receiving material has not been optimally selected. In particular, if excess energy is supplied, the stud will deform as the excess energy is transformed into deformation at the head, while the continuously widening transition section between the shank and the head assures proper fastening.

Still another feature of the present invention is the provision of a frusto-conical enlargement in the opening through the closed end or bottom of the cylindrical container-shaped member with the enlargement flaring outwardly to the outer surface of the closed end so that the enlargement serves to receive any of the receiving material displaced as the stud is driven in. This arrangment affords a form closure between the receiving material, that is, the structural steel support, and the member so that transverse forces can be absorbed without shearing forces acting on the stud.

Yet another feature of the invention is the provision of an increased wall thickness for the bottom or closed end of the member as compared to its wall thickness laterally enclosing the bore from the closed end to the opposite open end. Preferably the wall thickness of the closed end is about 1.5 to 2.5 times the thickness of the wall forming the bore.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
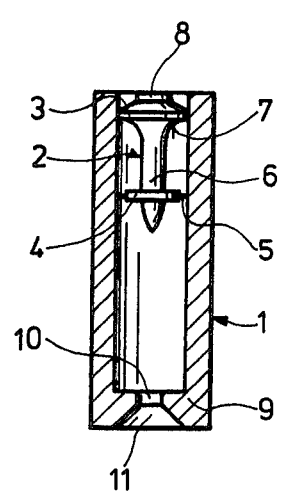
FIG. 1 is an elevational view, partly in section, of an anchoring assembly embodying the present invention.

In FIG. 1 an anchoring assembly is illustrated consisting of a cylindrical container-shaped member 1 having an axially elongated bore extending between an open end and a closed end of the bore with a stud 2 positioned in the bore adjacent the open end. Fastening stud 2 has an axially elongated shank 6 having a diameter considerably less than the inside diameter of the bore. A head 3 is located on one end of the shank with the outer circumferential periphery of the head having a diameter considerably greater than that of the shank and substantially corresponding to the diameter of the bore. A washer 4 is fitted onto the shank 6 of the stud and is spaced axially along the shank from the head. Stud 2 is guided in the bore of the member 1 by means of the head 3 and the washer 4. For retaining the stud in the bore of the member 1, the washer 4 is formed of plastic and has several radially outwardly extending projections or lugs 5, such projections being known. A transition section 7 extends from the trailing end of the shank to the head and the outer surface of the transition section is curved with its radius of curvature increasing from the shank to the head. The surface of the head facing outwardly at the open end of the member 1 has a cylindrically shaped shoulder 8 adapted for engagement with the leading end of the piston in an explosive powder actuated setting tool.

Member 1 has a closed end or bottom 9 in which an opening 10 is formed so that the shank 6 of the stud 2 can pass through the closed end into the receiving material. The opening 10, as it extends outwardly from the bore, is cylindrically shaped and then it changes over into a frusto-conical enlargement section 11 with the surfaces of the enlargement diverging outwardly to the outer surface of the closed end 9.

Figure 2:
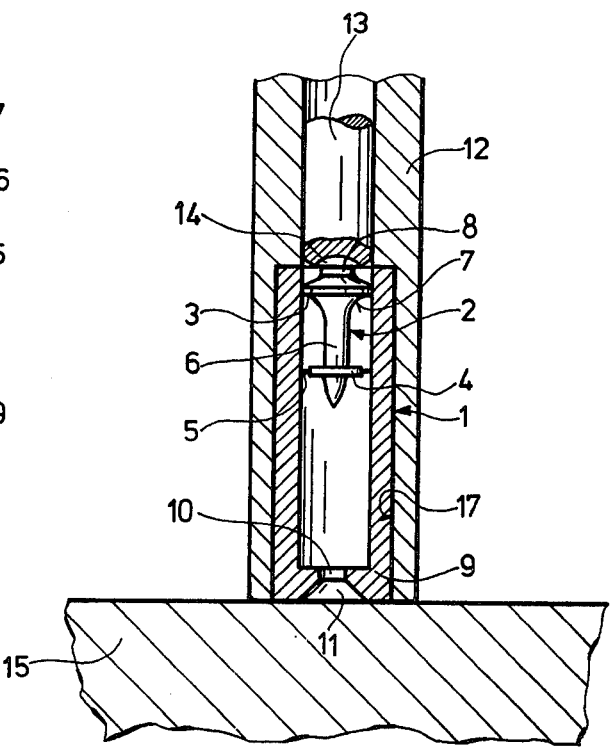
FIG. 2 displays the anchoring assembly of FIG. 1 introduced into the muzzle end of an explosive powder actuated setting tool before the tool has been fired.

In FIG. 2 the front or muzzle end portion of a setting tool is illustrated consisting of a barrel 12 and the leading end of a piston 13. Since such a setting tool is conventional further illustration or description is not required. In the leading end of the barrel 12 a recess 17 is formed for receiving the anchoring assembly consisting of the cylindrical container-shaped member 1 and the fastening stud 2. At its leading end, the piston 13 has a depression 14 into which the shoulder 8 on stud fits.

Figure 3:
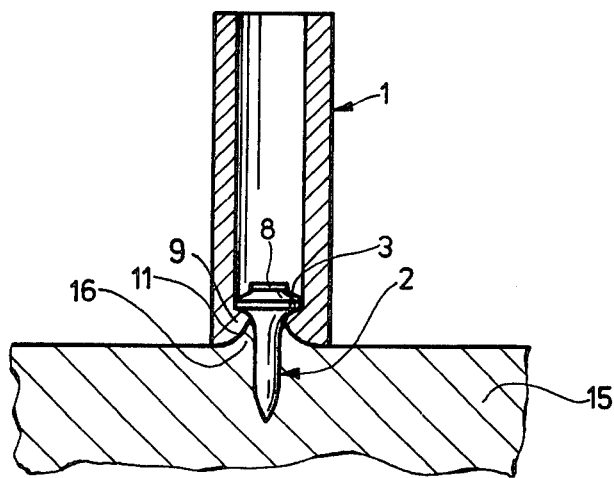
FIG. 3 illustrates the anchoring assembly of FIG. 1 fastened to a receiving material.

As shown in FIG. 2, before the anchoring assembly is secured to a receiving material 15, the container-shaped member 1 rests on the surface of the receiving material, that is, a structural steel section or a built-up beam. When the setting tool is fired, the explosive powder actuated piston drives only the stud 2 through the bore in the container-shaped member 1 so that its shank 6 passes through the opening 10 into the receiving material 15. During this fastening operation, the member 1 remains stationary relative to the barrel 12. The anchoring assembly fastened to the receiving material is shown in FIG. 3 with the setting tool removed. Fastening stud 2 has been completely driven into the receiving material 15 with its head 3 contacting the inside surface of the closed end 9. During the fastening operation, the plastic washer 4 has been displaced from between the head and the bottom of the bore permitting close contact between the head and the closed end. Further, FIG. 3 exhibits a part 16 of the receiving material which has been deformed due to the driving-in action of the fastening stud 2 with the deformed material bulging upwardly and penetrating into the recess formed by the frusto-conical enlargement 11 in the closed end 9 of the member. The outward bulging part 16 of the receiving material 15 provides a form-closing connection with the bottom of the cylindrical container-shaped member 1 which can absorb transverse forces developed in the composite structural member.

While specific embodiments of the invention have been shown and described in detail to illustrate the application of the inventive principles, it will be understood that the invention may be embodies otherwise without departing from such principles.

What is claimed is:

1. Anchoring assembly, in particular for use in a composite concrete and structural steel beam, comprising an axially extending cylindrical container-shaped member having a closed end and an open end spaced apart in the axial direction thereof and an axially elongated bore extending between the ends, a fastening stud positioned within the bore in said member and being partially displaceable therefrom by means of an explosive powder actuated fastening element setting tool applied to the open end of said member, said fastening stud comprising an axially elongated shank having a first end closer to the closed end of the bore and a second end closer to the open end of the bore and a head located at the second end of said shank and extending transversely outwardly therefrom, the closed end of said member having an opening therethrough spaced radially inwardly from the surface of the bore so that at least an axially extending portion of said shank of said fastening stud can be driven therethrough into a receiving material, wherein the improvement comprises that said fastening stud has an axial length considerably less than the axial length of the bore in the sleeve and is positioned in said bore with the first end of said shank spaced axially in the direction of said open end from the closed end thereof for being displaced toward the closed end by the setting tool.

2. Anchoring assembly, as set forth in claim 1, wherein the axial length of said fastening stud being positioned wholly within the bore with said head being located at the open end thereof.

3. Anchoring assembly, as set forth in claim 2, including guide means for guiding said fastening stud as it is driven through the bore, said guide means comprising a pair of guide surfaces spaced apart on the fastening stud in the axial direction of the bore.

4. Anchoring assembly, as set forth in claim 3, wherein a washer is positioned on said shank and spaced axially from said head, and said pair of guide surfaces comprises the radially outer circumferential periphery of said head and the radially outer surface of said washer.

5. Anchoring assembly, as set forth in claim 4, wherein the outer circumferential periphery of said head having a relatively large diameter as compared to the diameter of said shank, a transitional section extending between and interconnecting said head and shank, the outside surface of said transitional section forming a curved surface from said shank to said head with the radius of the curved surface increasing from said shank to said head.

6. Anchoring assembly, as set forth in claim 1, wherein the lateral surface of the opening through the closed end of said member being enlarged outwardly in the direction from the inside to the outside of said member.

7. Anchoring assembly, as set forth in claim 1, wherein the lateral surface of the opening and the closed end of said member from the outside surface thereof being frusto-conically shaped and converging inwardly toward the bore in said member for at least an axial portion of the opening.

8. Anchoring assembly, as set forth in claim 7, wherein the thickness of the closed end of said member being 1.5 to 2.5 times the thickness of said member laterally encircling the axially extending bore therein.

9. Anchoring assembly, as set forth in claim 4, wherein the outer circumferential periphery of said head having a diameter substantial the same as the diameter of the bore in said member so that the outer circumferential periphery thereof moves in sliding contact with the surface of said bore in said member as said fastening stud is driven through the bore.

10. Anchoring assembly, as set forth in claim 9, wherein said washer comprises an annular member and a plurality of holding lugs extending laterally outwardly from the radially outer surface of said annular member and the radially outer surface of said holding lugs forming the radially outer surface of said washer providing one of the pair of guide surfaces for said fastening stud.

11. Anchoring assembly, in particular for use in a composite concrete and structural steel beam, comprising a cylindrically shaped sleeve closed at one end and open at the other, an opening extending through the one end, said sleeve forming an axially extending bore from one end to the other end of said sleeve, a fastening stud positioned within the bore in said sleeve and being displaceable therethrough from the other end of the bore at least partially through the opening in the one end for insertion into a receiving material and for securing said sleeve to the receiving material, wherein the improvement comprises that the axially extending surface of the bore is spaced radially outwardly from the opening through the closed one end of said sleeve, said fastening stud comprising an axially extending shank having a first end closer to the one end of said sleeve and a head positioned at the other end of said sleeve, said fastening stud having an axial length considerably less than the axial length of the bore in said sleeve with the first end of said fastening stud being spaced axially in the direction of said open end from the closed one end of said sleeve, said shank having a diameter smaller than the diameter of the bore in said sleeve, and said head extending transversely outwardly from said shank and the outer circumferential periphery of said head having a diameter substantially the same as the diameter in said bore so that the outer circumferential periphery of said head rides in sliding contact with the surface of said bore as the stud is driven therethrough, a guide washer fitted onto said shank and spaced axially from said head, the radially outer surface of said washer being disposed in sliding contact with the surface of said bore of said sleeve, the opening through the one end of said sleeve comprising a cylindrically shaped section extending outwardly from the inner surface of said one end and a frusto-conically shaped section extending from said cylindrically shaped section to the outer surface of the one end and the diameter of the frusto-conically shaped section increasing in the direction toward the outer surface of the one end.

* * * * *